July 13, 1937.　　　F. L. SCOTT　　　2,086,681
CUTTER BEARING
Filed Feb. 29, 1936
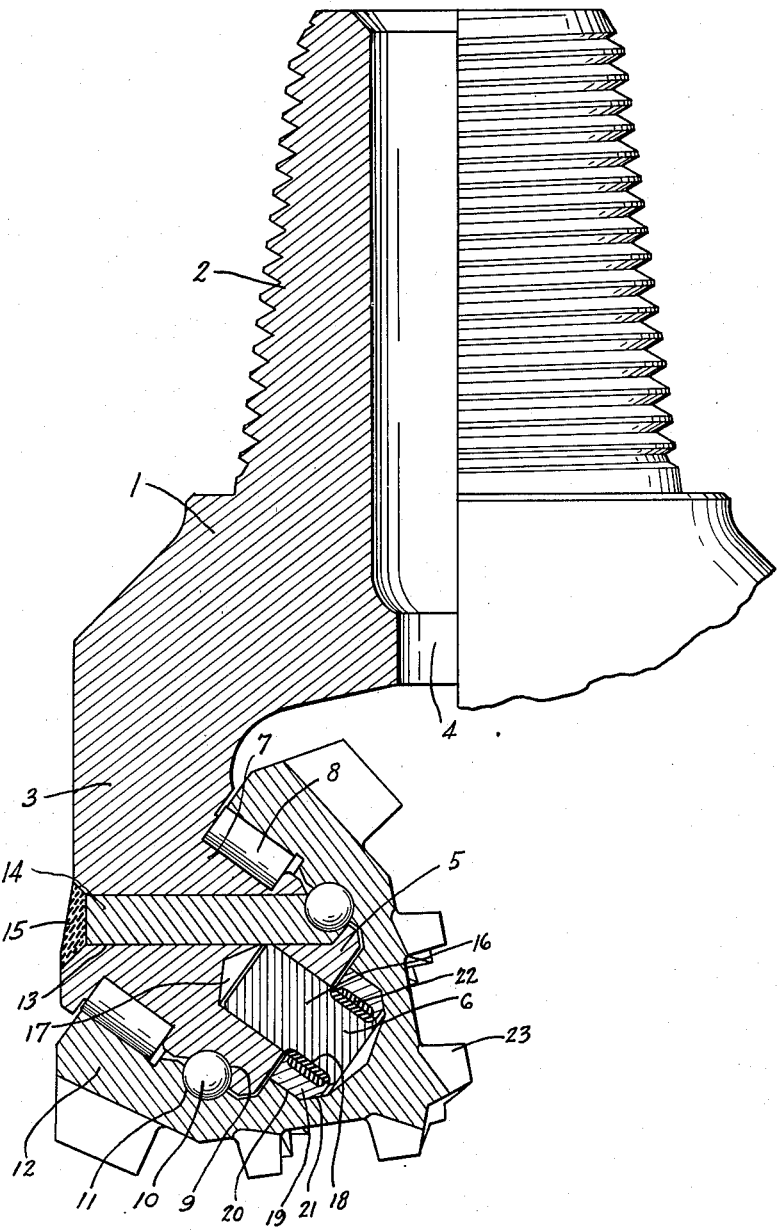
Floyd L. Scott
INVENTOR
BY Jesse R. Stone
ATTORNEY Patented July 13, 1937

2,086,681

UNITED STATES PATENT OFFICE 2,086,681

CUTTER BEARING

Floyd L. Scott, Houston, Tex., assignor to Hughes Tool Company, Houston, Tex., a corporation of Texas Application February 29, 1936, Serial No. 66,326

3 Claims. (Cl. 255—71)

My invention relates to bearings to be employed upon well drills. It has particular reference to well drills of the cone-cutter type wherein the cutters surround the ends of the shafts and rotate thereon.

It is an object of the invention to provide an efficient and durable bearing for the forward or smaller end of the cutter shaft. It has been customary heretofore to form a reduced extension at the forward end of the shaft to act as a side thrust member to prevent upward movement of the cutter on the shaft as wear occurs. It is found that the thrust upwardly in drilling against the bearing has a tendency to rotate the forward end of the cutter upwardly on the bearing and interfere with the cutting action of the drill. The adjacent cutters tend to move together and lock and the gauge of the hole is reduced.

To overcome this difficulty I contemplate forming a rotatable bearing surface which is adapted to be hardened in such manner as to greatly resist wear and prolong the life of the bearing.

I contemplate forming a rotatable bushing adapted to move with the cutter in rotation and to form a hard bearing surface on the shaft and on the interior of the bushing, thus extending the life of the cutter and bearing.

In the drawing herewith I have shown a side view partly in broken elevation and partly in central longitudinal section showing a cutter employing the invention.

The drill is one of ordinary construction having a head 1, with an upwardly tapered shank thereon threaded at 2 for engagement with a drill collar or tool joint. At the lower or forward end of the head is a pair of downwardly extending legs 3, one of which is shown as broken away and removed. There is a central channel 4 axially through the head to conduct flushing fluid downwardly to the cutters.

On the lower end of each leg 3 is a downwardly and inwardly inclined shaft 5 which is approximately cylindrical in shape but has a reduced forward extension 6 thereon, the construction of which will be presently noted.

Upon the larger body of the shaft 5 are antifriction bearing races. There is a raceway 7 toward the base of the shaft to receive the lower bearings 8. Further forward on the shaft is a raceway 9 to receive the ball bearings 10. The ball bearings are introduced into the raceway 9 and into a cooperating raceway 11 in the cutters 12 through a transverse opening 13 in the head and shaft after the cutters have been placed in position on the shaft. This opening or bore 13 is then filled by means of a cylindrical plug 14 which is fixed in position by a bond of welding material 15. The forward end of the plug 14 is formed with a recess to form a portion of the raceway 9 in which the balls roll.

At the forward end of the shaft 5 the forward pilot extension 6 is formed by driving a removable plug or pin 16 into a recess 17 formed in the end of the shaft 5. This pin has a driving fit in the end of the shaft and is fixed securely in position. It is made separately in order to more readily place thereon wear resisting bearing surface. This surfacing may be a layer 18 of Stellite or other hard material welded within an annular groove in the face of the pin. This bearing face is properly machined and hardened before the pin is driven into position.

Bearing upon the hard facing layer 18 of the bearing pin is a bushing 19. This bushing is in the shape of a ring or collar fitting closely over the bearing member 18 and having an outer surface which is cylindrical at 20 but beveled at its forward end as shown at 21. On the interior of the bushing and adjacent the bearing surface of the pin is a layer of hard facing material 22. This may be the same material as is employed upon the bearing shaft or may be a different hard material such, for example, as tungsten carbide. The bushing is adapted to rotate upon the cutter pin and contacts on its outer face with the interior of the cutter 12. There may be some relative movement between the cutter and the bushing or the bushing may move with the cutter.

The cutter member 12 is of ordinary construction. It has rows of cutting teeth 23 thereon and on its interior it is formed to fit upon the bearings which have been described. At the base it rolls upon the rollers 8. It also has a strong bearing upon the row of balls 10. The lateral or upward thrust upon the cutter is taken up on the bearing pin 6 and the wear due to rotation is strongly resisted by the hard facing on both of the bearing members 6 and 22.

It will be obvious that I have provided a wear-resisting bearing which will take up the strong thrust placed upon the same in use, enabling the bearing to wear for long periods of time until the outer surface of the cutter has been worn out. Any tendency of the cutter to wear at the point of the bearing shaft, allowing the gauge of the hole to be reduced, will be obviated through the use of this type of bearing.

What is claimed as new is:

1. In a well drill, a bearing shaft, said shaft being approximately cylindrical, a reduced extension at the forward end of said shaft, a layer of relatively hard material welded in the outer periphery of said extension, a bushing rotatable on said extension, a hard surfacing on the inner face of said bushing, and a cutter enclosing said shaft and bushing and rotatable on said shaft.

2. In a well drill, a downwardly inclined bearing shaft, a pilot bearing pin of reduced diameter at the forward end of said shaft, a layer of relatively hard material fixed on the outer periphery of said pin, a bushing rotatable on said pin, a layer of relatively hard material on the inner surface of said bushing, and a cutter rotatable on said shaft and bushing.

3. In a well drill, a downwardly inclined bearing shaft, a pilot bearing pin of reduced diameter at the forward end of said shaft, a layer of relatively hard material fixed on the outer periphery of said pin, a bushing rotatable on said pin, a layer of relatively hard material on the inner surface of said bushing, antifriction bearings on said shaft, and a cutter rotatable on said shaft and bushing.

FLOYD L. SCOTT.